United States Patent Office 3,662,026
Patented May 9, 1972

3,662,026
PROCESS FOR PREPARING GRAFT COPOLYMERS CONTAINING N,N-DI(BETA-HYDROXYETHYL) GLYCINE SALTS
George L. Rushton, Trenton, N.J., assignor to Cities Service Company, New York, N.Y.
No Drawing. Filed June 1, 1970, Ser. No. 42,574
Int. Cl. C08f 15/04
U.S. Cl. 260—880 R                               7 Claims

ABSTRACT OF THE DISCLOSURE

A composition comprising a graft copolymer resin and the alkali metal salt of N,N-di(beta-hydroxyethyl)glycine is characterized by improved color and gloss characteristics.

BACKGROUND OF THE INVENTION

Field of the invention

This invention relates to the improvement of the color and surface gloss of polymeric compositions. More specifically, it relates to a method for improving the color and gloss of a graft copolymer formed by the polymerization of an unsaturated monomer or mixture of unsaturated monomers in the presence of a polymeric substrate. In another aspect it relates to a graft copolymer composition containing an alkali metal salt of N,N-di(beta-hydroxyethyl)glycine incorporated therein.

The polymerization of various monomers or monomer mixtures in the presence of a polymeric substrate is known. For example, the polymerization of a vinyl aromatic monomer, exemplified by styrene, and a vinyl cyanide monomer, exemplified by acrylonitrile, or mixtures thereof, in the presence of an aqueous emulsion of an ethylenically unsaturated substrate, such as a butadiene polymer latex or butadiene-styrene copolymer latex, is well known. Such polymerization reactions, which often are initiated by a free radical source and employ sufficient water and surfactant to emulsify the monomers, result in at least partial grafting of the monomers onto the polymeric substrate to produce synthetic resins having superior physical and chemical properties. A wide variety of such synthetic resins, as well as suitable synthesis procedures, polymeric latices, monomer mixtures and proportions of reactants is described in the literature. These resins can also be prepared by methods such as graft suspension polymerization, mass polymerization, and resin blending. One of the better known resins is prepared by graft polymerizing a mixture of vinyl aromatic and vinyl cyanide monomers onto a polymeric substrate.

The physical properties of resins produced by these myriad procedures are primarily dependent on the proportions of the polymeric substrate and monomer employed in the polymerization, the specific reaction conditions, the type of free radical initiators and the type of molecular weight regulators. High impact strength is one of the important physical characteristics of such resins.

Recent developments have concentrated on procedures for improving the surface gloss and color of resins of this type. Such resins, as produced by the above indicated methods, can be prepared in the form of powders, beads or flakes and they are often processed and shipped in the form of pellets. Desirably, these base resins are as colorless as possible insofar as any discoloration will, of course, cause problems in the color of the finished product; variations in the base resin color will result in variations of the product as later pigmented. Such variations will require a subsequent processor to engage in extensive color matching, resulting in production interruptions and increased cost. The aforementioned discoloration can arise from a manufacturing step, such as may be caused by a contaminated reactor, or it can be the result of a processing step, such as extrusion at too high a temperature. Manufacturing methods that minimize discoloration are desirable. From the foregoing comments, it is apparent that a means for reducing or inhibiting the formation of color bodies during either the manufacture or processing of resins would be of significant benefit.

Another important and desirable property of graft copolymer resins is surface gloss. A dull, or controlled gloss, or matte finish is desirable for some products such as luggage. With other products, however, such as telephone hand sets and appliance housings, a shiny glossy finish is preferred. Surface gloss is affected by, among others, latex properties, the method of grafting the monomers onto the polymeric substrate, molding pressure and the presence of various additives. Each of these factors, however, may affect other properties of the resin such as impact strength and/or tensile strength. A base resin that can be processed to a product having a minimum of discoloration and a maximum of surface gloss without the addition of deleterious materials is desirable. This invention provides such a resin.

SUMMARY OF THE INVENTION

It has now been found that when the alkali metal salt of N,N-di(beta-hydroxyethyl)glycine is incorporated in a graft copolymer resin a composition is obtained which is characterized by improved color and surface gloss properties.

In one embodiment of this invention, the alkali metal salt of N,N-di(beta-hydroxyethyl)glycine can be added to the mixture of polymer latex and monomers, prior to polymerization. In another embodiment of this invention the alkali metal salt of N,N-di(beta-hydroxyethyl)glycine can be added to the reaction mixture subsequent to polymerization but prior to coagulation, as will be discussed more fully below.

In general, the preparation of the graft copolymer resins is accomplished by the polymerization of an unsaturated monomer or mixture thereof in the presence of a polymeric substrate. A preferred method involves graft emulsion polymerization methods in which suitable monomers are polymerized in a polymeric emulsion latex under grafting conditions. Other methods, such as graft suspension polymerization and the physical blending of copolymer resins, can be used to prepare polymer resins amenable to treatment as disclosed herein.

In accordance with the present invention the polymeric substrate, in the case of emulsion polymerization technique, is a polymer latex whose constituting unit can be a single diolefin series, for example a natural rubber latex, polyisoprene latex, polybutadiene latex or polychloroprene latex. Additionally, the polymeric substrate can be obtained by copolymerizing at least one mono-olefin with a conjugated diolefinic hydrocarbon, for example butadiene-isobutylene copolymer latex; butadiene-styrene copolymer latex; butadiene-acrylonitrile copolymer latex; butadiene-methyl methacrylate copolymer latex; butadiene-styrene-acrylonitrile terpolymer latex; and butadiene-styrene-vinyl pyridine terpolymer latex. Polybutadiene and poly (butadiene-styrene) are preferred. The unsaturated monomer or mixtures therof can be selected from among the vinyl aromatic monomers, vinyl cyanides, acrylates, methacrylates, vinyl halides, hydrocarbons, vinyl esters, vinyl ethers, vinyl pyridine, alkylesters of unsaturated acids, vinyl ketones, allyl chlorides and allyl acetates. In a preferred embodiment the monomers are selected from vinyl aromatic monomers, vinyl cyanide monomers and mixtures thereof.

The vinyl aromatic monomers are desirably selected from those compounds of the benzene series having the vinyl radical directly attached to a carbon atom of the aromatic nucleus, such as styrene, alpha-methyl styrene, vinyl toluene, vinyl xylene, isopropyl styrene, ethyl vinyl benzene, and halogenated derivatives thereof. In a preferred embodiment the vinyl aromatic monomer is selected from styrene and alpha-methyl styrene, with styrene being especially preferred.

The vinyl cyanide monomer is desirably selected from acrylonitrile and methacrylonitrile and can be partially replaced, if desired, with various esters and derivatives of the acrylic acid series. It is preferred to use acrylonitrile.

The polymeric substrate and unsaturated monomers can be combined in a variety of proportions, resulting in a graft copolymer resin which can contain, in one embodiment, from about 5% to about 35% by weight of the polymeric substrate, from 15% to about 35% by weight of the vinyl cyanide monomer and from about 40% to about 80% by weight of vinyl aromatic monomer.

As indicated above, in producing the polymer composition of the present invention the polymerization may be carried out by ordinary emulsion polymerization. Thus, the polymerization may be carried out by using a fatty acid soap, alkyl sulfonate, alkyl sulfate, disproportionated rosinate or nonionic surface active agent as an emulsifier, and a free radical catalyst such as azobisisobutyronitrile or a redox catalyst such as a persulfate or peroxide as a polymerization initiator at a temperature above about 20° C. but below about 95° C.

In such case, the molecular weight in the polymerization can be regulated by the addition of a polymerization regulator such as n-dodecyl and mixed tertiary mercaptans, for example those containing a mixture of $C_{12}$, $C_{14}$ and $C_{16}$ mercaptans. Further, before the start or after the completion of the polymerization, as antioxidant such as beta-naphthylamine or a butylated bisphenol-A can be added.

The polymerization reaction is typically continued until the reaction is substantially completed. At the end of the reaction the reaction product is coagulated, for example, with a solution of calcium chloride, washed and then dried by any suitable means.

Resins prepared as indicated above have improved gloss and color when the alkali metal salt of N,N-di(beta-hydroxyethyl)glycine is incorporated therein. The salts which are useful within the scope of the present invention are available from a variety of sources. In one aspect the salts are available by neutralizing N,N-di(beta-hydroxyethyl)glycine with an appropriate alkali metal compounds, such as an alkali metal hydroxide. It should be noted at this point that N,N - di(beta - hydroxyethyl)glycine is an article of commerce, and it therefore is readily available. In another more direct fashion, the desired salts, such as the sodium salt, are commercially available from, among others, Geigy Industrial Chemicals and Hampshire Chemical Div. of W. R. Grace and Company. While the alkali metal derivatives of N,N-di(beta-hydroxyethyl)glycine are generally useful, it is preferred to use either the potassium or sodium derivatives, with the sodium derivative being especially preferred.

The alkali metal salt of N,N-di(beta-hydroxyethyl) glycine can be incorporated into the graft copolymer resins in a variety of ways. Best results are obtained when the salt is added to the completed resin subsequent to polymerization but prior to coagulation. The salts can be added in any convenient form and, where an emulsion polymerization system is used, the salt is most simply incorporated as an aqueous solution. The compositions of this invention contain an amount of the alkali metal salt of N,N-di(beta-hydroxyethyl)glycine sufficient to improve the gloss and color. While it is possible that for various batches and various graft copolymer resin systems varying amounts of the salt might be required, it has been found that, in general, from about 0.05% to about 0.5% of the salt, based on the weight of the resin composition, is usually adequate. It is preferred to use from about 0.1% to about 0.3% by weight of the graft copolymer composition. Although these salts can be used in amounts greater than about 0.5% by weight, the addition of a large excess is undesirable insofar as the system might coagulate.

DESCRIPTION OF THE PREFERRED EMBODIMENT

Example I 592 parts by weight of a butadiene-styrene copolymer latex containing 25% bound styrene and characterized by a solids content of about 70%, an average particle size of 0.5 micron and a gel content of about 77%, 852 parts by weight of styrene, 282 parts by weight of acrylonitrile, 7.1 parts by weight of potassium persulfate free radical initiator, 7.1 parts by weight of mixed $C_{12}$, $C_{14}$ and $C_{16}$ mercaptan chain length regulators and 540 parts by weight of demineralized water were combined thusly: The styrene and acrylonitrile monomers, plus the chain length regulator, were combined and mixed thoroughly. The latex, diluted with approximately 50% of the demineralized water, was added to a reactor, followed by the addition of one-half the monomer-chain length regulator mixture. This mixture was gradually heated to the reaction temperature of 70° C., at which time the free radical initiator, dissolved in the remaining 50% of the demineralized water was added. The temperature was maintained at 70° C. One hour after the addition of the initiator, the remaining half of the monomer-chain length regulator mixture was added gradually over a period of two hours, while maintaining the reaction temperature at 70° C. The reaction was continued for an additional hour, resulting in a total of five hours at 70° C. About 15 minutes prior to the end of the reaction period, 15 parts by weight of di-tert. butyl-para-cresol, an antioxidant, was added. The resin was isolated from the polymerization mixture by coagulation in a 1% solution of calcium chloride, followed by washing and drying. The dried resin powder was used directly in an injection molding machine for the preparation of test samples. Color and gloss tests were made upon test bars, one inch by six inches by one-eighth inch, injection molded at a temperature of approximately 440° F. Color was evaluated as follows: A graft copolymer of acrylonitrile and styrene on a polybutadiene substrate having a brightness of approximately 50 as determined according to the CIE tristimulus method was given a value of 100 color units. A second acrylonitrile-butadiene-styrene graft copolymer having a brightness of about 25 (CIE tristimulus) was given a value of 80 color units. These two resins were combined in 5% increments (95–5%, 90–10%, etc.) and molded into test bars so that twenty test bars having color unit designations between 80 and 100 were obtained. CIE tristimulus coordinates were determined for selected test bars, as reported below. All determinations were run on a Bausch & Lomb Spectronic 505 Recording Color Spectrophotometer using CIE illuminant C. Results are reported according to the selected-ordinate method.

TABLE I

| Color units | X | Y | Z | Brightness (=100Y) |
|---|---|---|---|---|
| 80 | .2496 | .2478 | .1891 | 24.78 |
| 85 | .2854 | .2856 | .2253 | 28.56 |
| 90 | .3347 | .3390 | .2825 | 33.90 |
| 95 | .3890 | .4098 | .1742 | 40.98 |
| 100 | .4798 | .4974 | .5505 | 49.74 |

Briefly, the CIE system (Commission International de-l'Eclairage or International Commission on Illumination) is based on the concept of additive color mixing as derived from experiment in which colors are matched by mixing colored lights. Thus, colors can be specified in terms of three numbers representing the amounts of three primary lights added together to make the match. The amounts of the three primaries are called the tristimulus values of the color. A complete discussion of the theory and practice relative to the CIE system can be found in "Principles of Color Technology" by Billmeyer and Saltzman (Interscience, 1966).

The gloss test was made on a test bar having the dimensions of the color bar, and surface gloss was determined by a Gardner Glossmeter.

In each of the runs set forth in the table below, the additive was evaluated by preparing the resin as indicated above and by incorporating the indicated percentage of the additive in the latex mixture prior to polymerization. In all cases the amount is indicated as weight percent of a completed copolymer composition.

TABLE II

| Additive | Gloss | Color |
|---|---|---|
| None | 70 | 80 |
| Citric acid, 0.1% | 70 | 80 |
| Borax, percent: | | |
| 0.1 | 61 | <80 |
| 0.3 | 74 | <80 |
| Tetrasodium pyrophosphate ($Na_4P_2O_7$), percent: | | |
| 0.1 | 53 | <80 |
| 0.3 | 61 | <80 |
| Sodium salt of N,N-di(beta-hydroxyethyl)glycine, percent: | | |
| 0.1 | 79 | 89 |
| 0.3 | 79 | 91 |
| 0.3 [a] | 79 | 92 |

[a] Added at completion of polymerization reaction, but before coagulation.

It can be seen from the foregoing examples, tabulated in Table II, that the untreated resin has a gloss of 70 and a color 80, and that the various additives failed to substantially alter the gloss or color characteristics of the resin. It is seen that it is only the alkali metal salt of N,N-di(beta-hydroxyethyl)glycine which provides a substantial change in both gloss and color. It will also be seen that the desirable results are similarly obtained irrespective of whether the alkali metal salt of N,N-di(beta-hydroxyethyl)glycine is added to the mixture of monomers prior to polymerization or whether it is added to the completed resin subsequent to polymerization but prior to coagulation. The use of 0.1 wt. percent potassium salt of N,N-di(beta-hydroxyethyl)glycine provides equivalent results with respect to gloss and color.

I claim:

1. In a process for emulsion polymerizing about 40–80% by weight of a vinyl aromatic monomer and about 15–35% by weight of a vinyl cyanide monomer in the presence of about 5–35% by weight of a conjugated diene polymer to form a graft copolymer emulsion and subsequently coagulating this emulsion to recover the graft copolymer composition, the improvement which comprises incorporating into the graft copolymer composition before the coagulation step about 0.05–0.5%, based on the weight of the graft copolymer composition, of an alkali metal salt of N,N-di(beta-hydroxyethyl)glycine.

2. The process of claim 1 wherein the alkali metal salt is added to the emulsion of monomers and conjugated diene polymer before polymerization.

3. The process of claim 1 wherein the alkali metal salt is added to the graft copolymer emulsion after completion of the polymerization.

4. The process of claim 3 wherein the amount of alkali metal salt employed is about 0.1–0.3%.

5. The process of claim 3 wherein the alkali metal salt is the sodium salt.

6. The process of claim 5 wherein the vinyl aromatic monomer is styrene or aplha-methylstyrene, the vinyl cyanide monomer is acrylonitrile or methacrylonitrile, and the conjugated diene polymer is polybutadiene or a butadiene-styrene copolymer.

7. The process of claim 6 wherein the vinyl aromatic monomer is styrene and the vinyl cyanide monomer is acrylonitrile.

References Cited

UNITED STATES PATENTS 3,068,192  12/1962  White _____ 260—880
3,341,623  9/1967  Hahn _____ 260—880

FOREIGN PATENTS 923,843  4/1963  Great Britain ____ 260—93.5 W

JAMES A. SEIDLECK, Primary Examiner